United States Patent [19]
Johanson

[11] Patent Number: 5,475,785
[45] Date of Patent: Dec. 12, 1995

[54] ILLUMINATION DEVICES AND METHODS OF FORMING SAME

[76] Inventor: Walter A. Johanson, 250 E. Fifth St., #401, St. Paul, Minn. 55101

[21] Appl. No.: 55,188

[22] Filed: Apr. 30, 1993

[51] Int. Cl.⁶ .................................................. G02B 6/00
[52] U.S. Cl. .............................................. 385/100; 385/133
[58] Field of Search ........................... 362/32; 385/133, 385/100, 900, 901

[56] References Cited

U.S. PATENT DOCUMENTS

| | | | |
|---|---|---|---|
| 4,260,220 | 4/1981 | Whitehead | 385/133 |
| 4,542,449 | 9/1985 | Whitehead | 362/330 |
| 4,615,579 | 10/1986 | Whitehead | 385/133 |
| 4,750,798 | 6/1988 | Whitehead | 385/133 |
| 4,787,708 | 11/1988 | Whitehead | 385/133 |
| 4,791,540 | 12/1988 | Dreyer, Jr. et al. | 362/331 |
| 4,805,984 | 2/1989 | Cobb, Jr. | 385/133 |
| 4,834,495 | 5/1989 | Whitehead et al. | 385/133 |
| 4,850,665 | 7/1989 | Whitehead | 385/133 |
| 5,016,143 | 5/1991 | Aikens | 362/32 |
| 5,095,415 | 3/1992 | Anderson et al. | 362/329 |
| 5,109,465 | 4/1992 | Klopotek | 385/133 |
| 5,117,478 | 5/1992 | Cobb, Jr. et al. | 385/133 |

FOREIGN PATENT DOCUMENTS

| | | | |
|---|---|---|---|
| 4303548 | 10/1992 | Japan | 313/635 |
| 2145760A | 4/1985 | United Kingdom | 385/133 |

OTHER PUBLICATIONS

Whitehead et al., Applied Optics, vol. 21, No. 15, 1 Aug. 1982, "New efficient light guide for interior illumination", pp. 2755–2757.

3M Scotch Optical Lighting Film Application Bulletin—Photometrics, Sep. 1989, pp. 1–10, 3M Traffic Control Materials Div.

*Primary Examiner*—Frank Gonzalez
*Attorney, Agent, or Firm*—Galgano & Burke

[57] ABSTRACT

Illumination devices and methods of forming illumination devices, utilizing optical light films are disclosed. Joints useful in forming light carriers from optical light films are also disclosed.

7 Claims, 13 Drawing Sheets

ILLUMINATION DEVICES AND METHODS OF FORMING SAME

BACKGROUND OF THE INVENTION

The present invention relates to light conducting and light emitting tubes, herein referred to as "light tubes", and novel optical light films having an embossed prism pattern to contain and channel the light when formed into a tube. More particularly, the present invention is concerned with laminated tube construction and methods of constructing light tubes to achieve a wide range of illumination effects including the piping of light from an accessible, concentrated light source to distal areas and the release of such light in widely variable patterns.

Optical light films (OLFs) can be efficiently manufactured from polymers in flat, flexible, but fragile films and made to perform a myriad of illumination functions. The film can be formed into various tubular and other partially closed configurations by supporting it together with supplemental light controlling films or elements in preformed carrier tubing having light-permeable characteristics. For example, a sheet of OLF can be formed into a closed tube by disposing one longitudinal edge of the OLF adjacent the opposite longitudinal edge. Alternatively, a sheet of OLF can also be formed into a partially closed tube, for example having an arched cross-section, and maintained in such a configuration with a supporting structure. As used herein, the term "tube" is used broadly to include both closed and partially closed configurations.

In addition to carrying light from a source of illumination such as a high-intensity light bulb to a remote location, light tubes can also be used for emitting light over relatively large areas. For this purpose, various methods have been devised to direct light out of a light tube over portions of the tube length. One method involves placing a clear adhesive tape on the outer, grooved side of an optical light film. A clear tape placed in this manner reduces the internal reflectance of the optical light film in the taped area and essentially creates a window for "escaping" light. Another method simply involves removing a section of the optical light film where internal reflectance is not desired. Portions of a tube lacking optical light film will permit light to escape. A third method comprises forming a light tube with some means for directing the light at the walls of the optical light film at an angle greater than about 28°. At such angles of incidence, the internal reflectance of the optical light film is greatly reduced. For example, the 3M Company of St. Paul, Minn., produces a product marketed under the name "X-70" which directs incident light at an angle of about 90° to the angle of incidence. If a piece of "X-70" is positioned within a light tube, light moving generally along the longitudinal axis of the tube will be directed through the "X-70" substantially perpendicular toward a sidewall and out of the light tube. Another product, marketed under the name "SCOTCH-CAL EXTRACTOR FILM™", directs light toward and through an opposite interior wall.

Since optical light film is fragile and sensitive to dirt and moisture, it is typically positioned within protective, outer tubes. Such tubes are generally transparent and can have a variety of finishes e.g. clear, matte, colored or opaque. The ability to insert the fragile optical light films into a carrier tubing, typically an extrusion product, is an impediment to the light tube designer. Moreover, shipping fabricated light tubes is costly because of their high volume relative to volume of component displacement and their inherent vulnerability to damage by breaking and scratching. Thus the low manufacturing cost of the critical optical film component is heavily offset by shipping costs. Also lost is the ability of the designer to achieve at acceptable cost finished products which feature many of the useful and underlying lighting functions which the optical light film is inherently capable of performing.

It would therefore be desirable to provide novel methods for forming light tubes and light tube products using the films which are cost effective, optically efficient and functionally varied.

SUMMARY OF THE INVENTION

The present invention comprises improvements in methods of forming light carriers and the resulting light carriers comprising optical light film.

One embodiment of the present invention comprises an optical light film formed with a generally U-shaped connector which, along with other elements, forms a slot for securely receiving at least portions of the longitudinal edges of the optical light film. This embodiment advantageously permits on-site fabrication of light tube having substantially total (i.e. 360°) internal reflectance.

Another embodiment of the present invention comprises an improved optical light film which advantageously allows controlled amounts of light to exit the light tube without the need for supplemental extractors.

Another embodiment of the present invention comprises a decorative light fixture comprising a source of illumination, a light tube comprising OLF which emits light over the length of the tube and is also provided with an emitter for changing the direction of light exiting the distal end of the light tube.

A still further embodiment of the present invention comprises a decorative illumination device comprising a light tube disposed substantially concentrically within an outer protective tube.

A further aspect of the present invention comprises a novel, heat resistant connector which provides a durable connection between light tubes or portions of light tubes, for example between a optical light film tube and a bulb housing.

Another aspect of the present invention comprises a light tube comprising a tapering, optical light film tube. As explained in greater detail below, a substantially continuous illumination may be obtained over the length of a light tube by providing a carefully measured converging taper to the light tube in the direction extending away from the source of illumination.

Another decorative embodiment of the present invention comprises two sheets of optical light film positioned with the grooves in contact and with the grooves disposed at an angle of at least 45°, and most preferably at an angle of substantially 90°. This embodiment creates the decorative illusion of a flame in the light tube. Colored filters can be used to provide images of flames of different colors.

These and other embodiments are described in further detail below.

DETAILED DESCRIPTION

One embodiment of the present invention is directed to a light carrier comprising at least one sheet of optical light film 10 which is maintained in a tube configuration by a novel joint. The optical light film preferably has enough flexibility and sufficient width so that one longitudinal edge 14 can be moved to a position proximate the other longitudinal edge 14 thereby forming a tube, preferably having a generally cylindrical shape. Unless otherwise specified, the term "optical light film" is used herein to refer to flexible films having a surface comprising a plurality of substantially triangular grooves which reflect substantially all of the light incident on the opposite side of the film at an angle of less than about 30° when formed into a light tube. Such film is available from the 3M Corporation, St. Paul, Minn.

Figure 1:
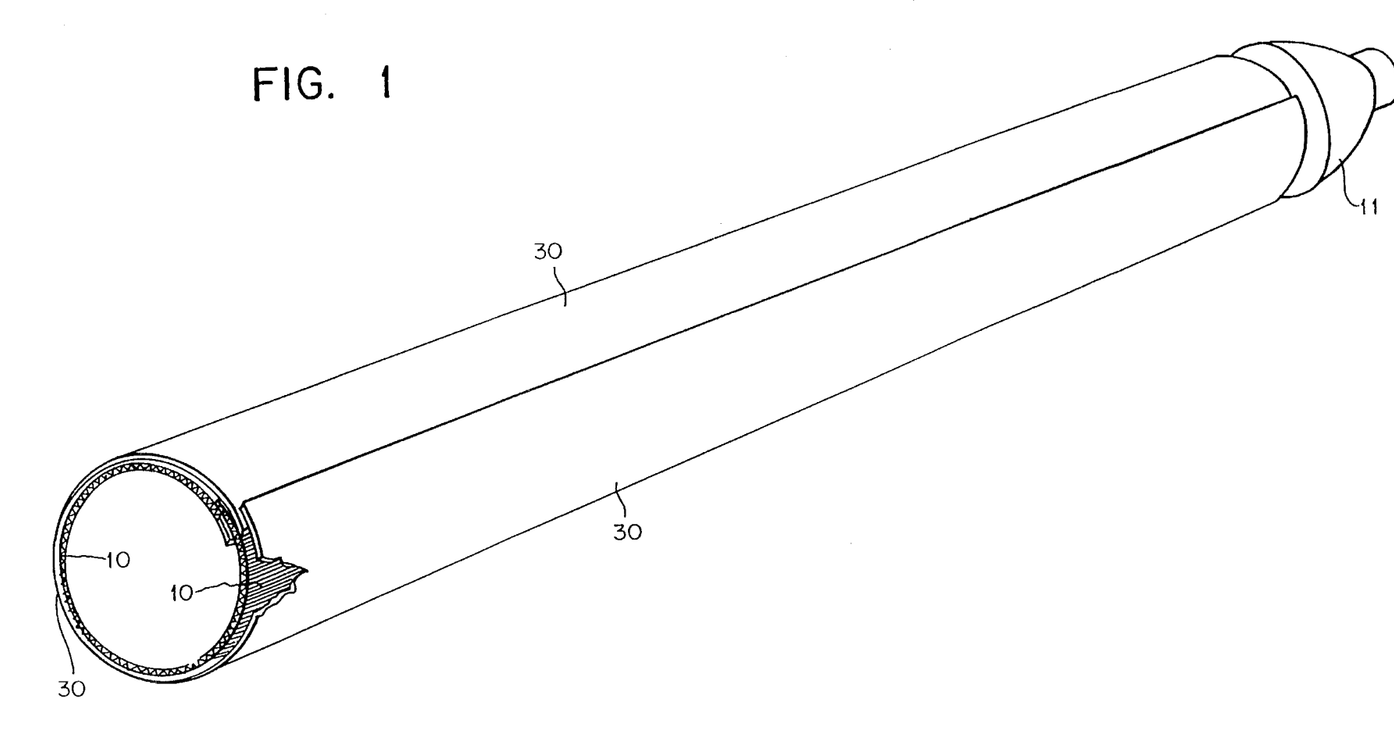
FIG. 1 is a perspective view of a light tube and bulb of one embodiment of the present invention.
Figure 2:
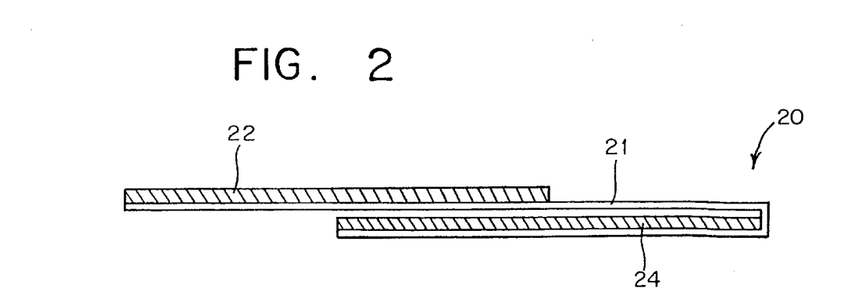
FIG. 2 is a cross-sectional view of a connector used with the light tube illustrated in FIG. 1.

According to this embodiment of the present invention, which is illustrated in FIGS. 1–5, the opposing longitudinal edge regions of an optical light film 10 are maintained in position using a generally U-shaped connector 20 proximate bulb 11. With reference to FIG. 2 which illustrates one particularly preferred embodiment of a U-shaped connector 20, comprising a pliable strip 21 provided with a first strip of adhesive tape 22 on the top of one end of the flexible strip and a second strip of adhesive tape 24 positioned on the bottom of the other longitudinal edge of strip 21. The strip 21, which is preferably formed of a clear polymeric material, is then simply configured to form the generally U-shaped connector 20 illustrated in FIG. 2. As illustrated, according to this embodiment, the upper side of the U-shaped connector 20 is preferably longer than the bottom side and the first adhesive tape 22 affixed to the upper side does not extend to the point on the strip 20 where the strip 20 is folded. As shown, once the flexible strip is folded into the U-shape, the second adhesive tape 24 is on the inner surface of the U-shaped member and the first adhesive 22 is on an outside surface of the U-shaped member.

As illustrated, it is not necessary that both sides of the U-shaped member have the same length. It will also be noted that the adhesive tape may be a double-sided adhesive tape, i.e., a central carrier having adhesive on both sides. More preferably, the adhesive tape can be a Very High Bond Tape available from the 3M Corporation of St. Paul, Minn. which exhibits adhesiveness throughout. Those skilled in the art will also appreciate that the thickness of the adhesive tape utilized can be varied for different applications depending upon such factors as the strength required and any thickness characteristics inherent in the particular tube design.

Figure 3:
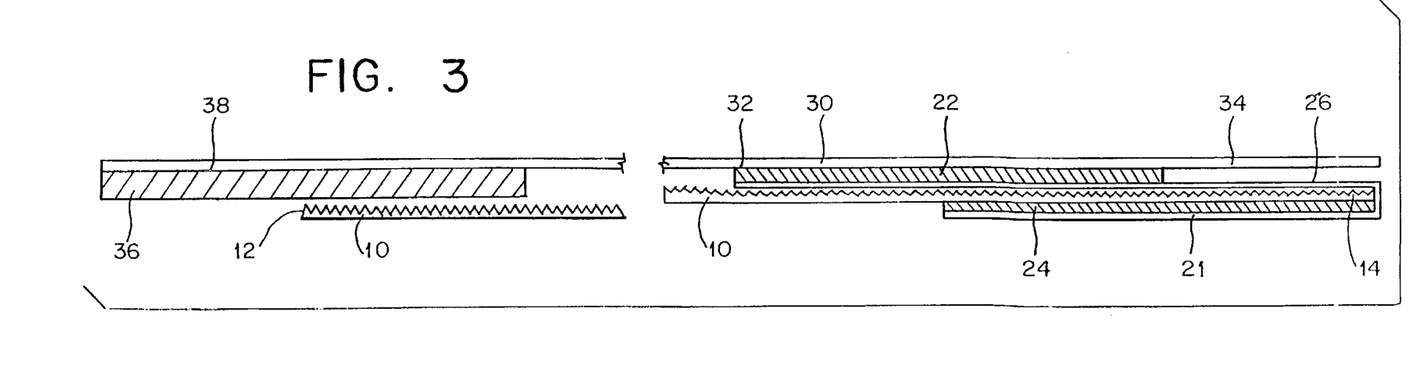
FIGS. 3–5 are cross-sectional views illustrating the arrangement of films and a connector of two embodiments of the present invention.
Figure 4:
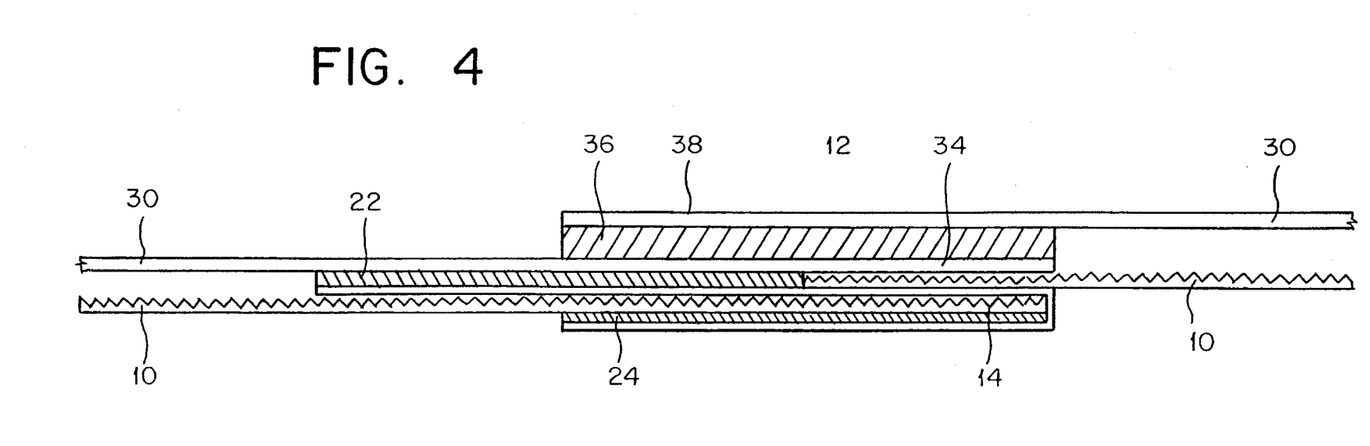
Figure 5:
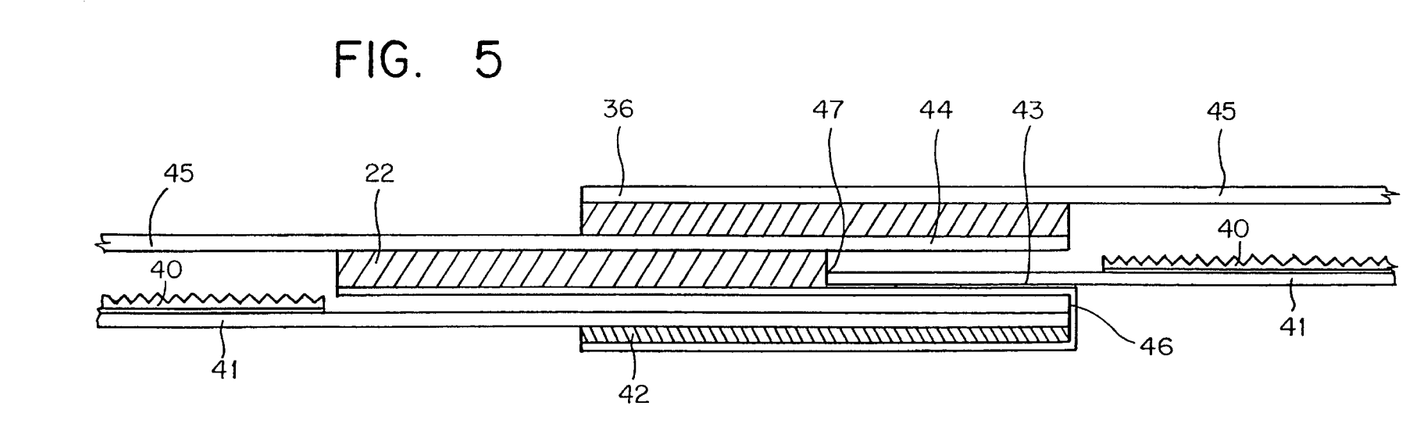

According to the illustrated embodiment, a second flexible sheet 30 substantially surrounds and protects the optical light film 10. In forming this embodiment, at least a portion of longitudinal edge 12 of the optical light film 10 is inserted into the slot defined by the second adhesive tape 24 and the inner surface of the U-shaped connector 20. With reference to FIG. 3, a contact region 32 which is remote from a longitudinal edge of the second sheet 30 is then contacted with the first adhesive tape 22. The longitudinal edge region 34 of the second sheet 30, along with the exposed, upper, outer surface 26 of the U-shaped member, forms a slot for receiving the other end of the optical light film 10. Prior to configuring the optical light film 10 to form the substantially closed light tube, another strip of adhesive tape 36 is preferably positioned on the bottom surface the opposing edge of the second sheet 30 proximate opposing edge 38. In this manner, when the sheets are configured to place the edge of the optical light film 10 into the slot defined by the U-shaped member 20 and the first edge region 34 of the second sheet 30, the second edge region 38 of the second sheet 30 can be readily adhered to the top of the first edge region 34 of the second sheet 30 in the manner illustrated in FIG. 4. This embodiment is particularly useful in forming tubes with predetermined diameter(s) over the length of the tube. Additionally, this embodiment advantageously permits on-site fabrication of light tube having substantially total (i.e. 360°) internal reflectance.

Depending upon the intended use of the light tube, it may be desirable to sandwich one or more sheets of optical light film between sheets of polymeric material. According to an alternative embodiment of the present invention illustrated in FIG. 5, this can be readily accomplished in a fashion similar to the embodiment illustrated in FIGS. 2–4 by positioning a sheet of optical light film 40 on the exterior side of a third sheet 41 which is preferably at least approximately the same size as the optical light film 40 and then inserting the third sheet 41 into the slots defined above. Namely, one longitudinal edge of sheet 41 is advantageously inserted into a first slot defined by an inside wall of the U-shaped connector 46 and an adhesive 42, and the opposite longitudinal edge is placed into a second slot defined by an outside surface 43 of the U-shaped member 46 and an edge region 44 of the outermost sheet 45. From the present description, those skilled in the art will appreciate that the upper longitudinal edge regions, as shown in FIGS. 2–5, will be held within the second slot in part, due to an edge bond with the adhesive tape 47 positioned on the upper, outer surface 43 of the U-shaped member 46. This edge bond provides additional adherence but is not necessary in order to practice this embodiment of the present invention.

Another embodiment of the present invention utilizes the decorative advantages of a light tube in a novel light fixture. In accordance with the illustrated embodiment shown in FIG. 6, this light fixture comprises a light source, preferably comprising a metal halide bulb 51, a ballast 52, a decorative light tube 60 and a light emitter 75.

Figure 6:
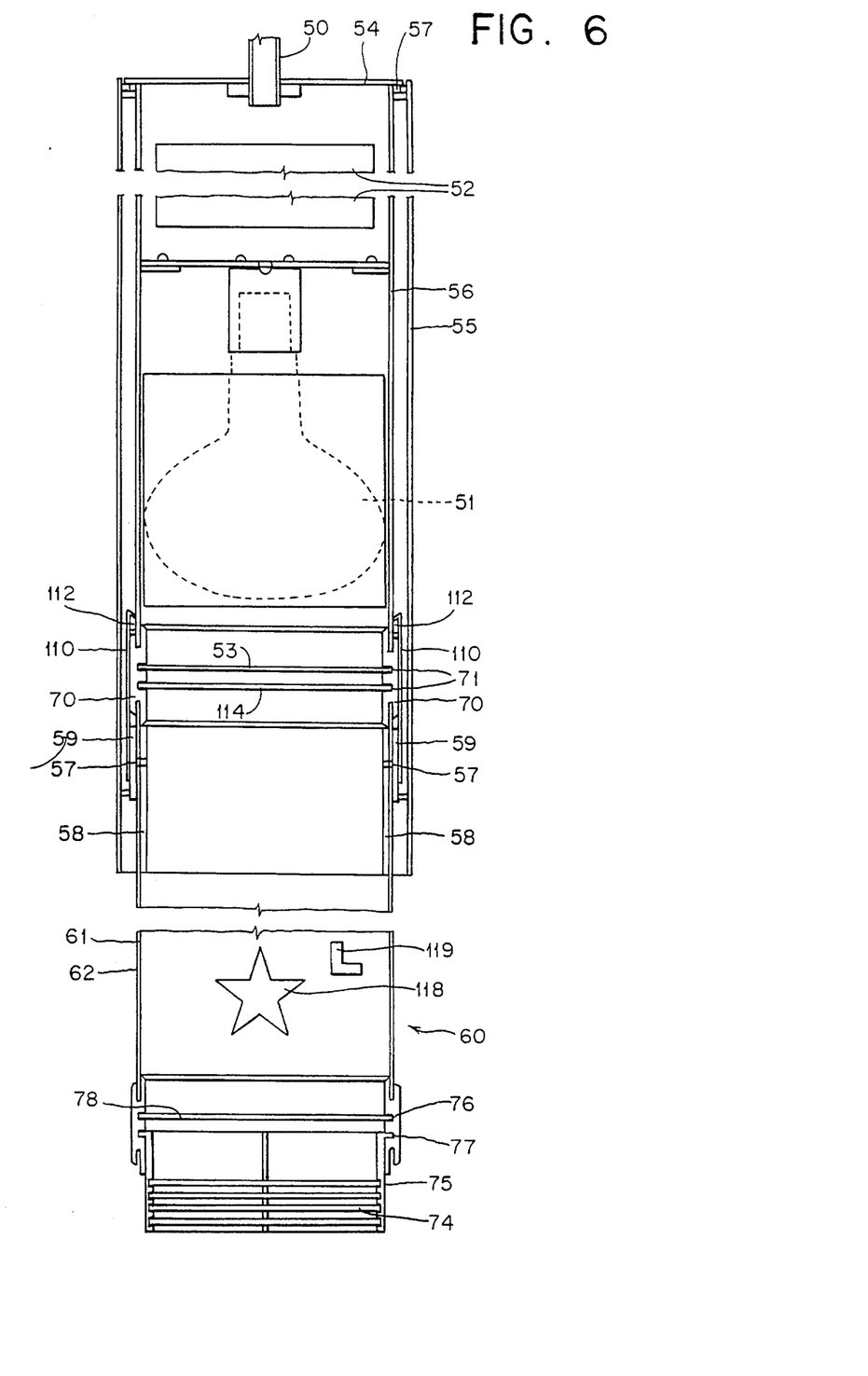
FIG. 6 is a cross-sectional view of an illumination device of the present invention.

According to the illustrated embodiment which is in the form of a hanging light fixture, a support hanger 50 is suitably wired to a supply of electrical power and to ballast 52 which in turn powers bulb 51. According to the illustrated embodiment, bulb 51 is preferably positioned within a protective housing.

As shown in FIG. 6, the illustrated housing comprises outer sleeve 55 and an inner sleeve 56. Outer sleeve 55 is removably connected to a top cover 54 by a twist connector 57. Outer sleeve 55 can therefore be readily removed by simply rotating outer sleeve 55 relative to top cover 54. Inner sleeve 56 is advantageously provided with sufficient openings to allow a person to change bulb 50 after outer sleeve 55 has been removed. Outer sleeve 55 can then be raised back into position and secured to upper support 54.

As shown in FIG. 6, light tube 60 is suspended from inner sleeve 56. While those skilled in the art will appreciate that there are many suitable methods of connecting light tube 60 to inner wall 56, the illustrated embodiment utilizes a mechanical connection comprising screws 57 which pass through holes in clips 110 light tube 60. Clips 110 are suspended from flanges 112 which are connected, for example by welding, to inner wall 56. Clips 110 extended downwardly beyond retaining ring 70 and preferably overlap a portion of light tube 60. In order to provide greater support and reduce the likelihood of damage to the light tube 60, a substantially rigid support ring 58 is advantageously positioned inside the upper portion of light tube 60. The substantially rigid ring may be formed of any suitable material, for example, a metal such as polished aluminum. The illustrated embodiment also comprises a spacer 59 in order to maintain the light tube 60 and inner protective wall 56 in a substantially-parallel spaced relation. Therefore, supporting screws 57 pass through holes in rigid support ring 58, light tube 60, spacer 59 and clips 110. Screws 57 do not contact outer protective sleeve 55 and therefore do not interfere with the movement of outer sleeve 55 when it is necessary to change a light bulb 51. In this manner, vertical support is provided to light tube 60 and light tube 60 is also substantially thermally insulated from the heat of bulb 51.

In order to obtain desired lighting effects, it may be desirable to position lenses, for example colored lenses, or light filters between bulb 51 and light tube 60. For this purpose, a retaining ring 70 is advantageously disposed below bulb 51. In the illustrated embodiment, a lens 53 is maintained in a position substantially perpendicular to the longitudinal axis of the light tube with a retaining ring 70 formed of a heat resistant material. For example, the retaining ring 70 may be formed of a silicone compound, such as the "6750 silicon resin" sold by General Electric Company of Waterford, N.Y., which is sufficiently pliable to allow the retaining ring 70 to be positioned within the bulb housing and also to permit the placement of lenses. The illustrated retaining ring 70 is provided with two inwardly facing grooves 71 and two vertically disposed grooves 72, one opening upwardly and the other opening downwardly.

As illustrated in FIG. 6, light tube 60 of the illustrated embodiment advantageously extends upwardly beyond the upper edge of rigid ring 58 into the lower slot 72 of lens retaining ring 70. A suitable heat-resistant adhesive may also be used within lower vertical groove 72 for bonding retaining ring 70 onto light tube 60. The mechanical connection performed by screws 57 provides support to retaining ring 70. Retaining ring 70 may also be used to support a clear Pyrex® lens. Pyrex® is particularly advantageous since it prevents some of the ultraviolet waves and heat emitted by a light source from harming the polymers used in this illumination device. It also keeps out dust and moisture. Retaining ring 70 may also be used to support a colored filter 114 in order to create desired illumination effect.

While those skilled in the art will appreciate that variations in the construction of the illustrated light tube 60 may be made without departing from the scope of the present invention, for purposes of illustration, the light tube shown in FIG. 6 is shown as simply comprising an inner sheet of optical light film 61 and an outer sheet 66 of a protective polymeric material. From the present description and drawings, those skilled in the art will also appreciate that a wide variety of designs may be employed in the construction of light tube 60. The amount of light exiting through the side walls of the light tube can be varied through the use of extractors described above and/or interruptions in the optical light film. FIG. 6 illustrates an extractor 118 formed into the shape of a star and a relieved section 119 wherein the optical light film has been removed in order to interrupt the internal reflectance in these areas.

Figure 7:
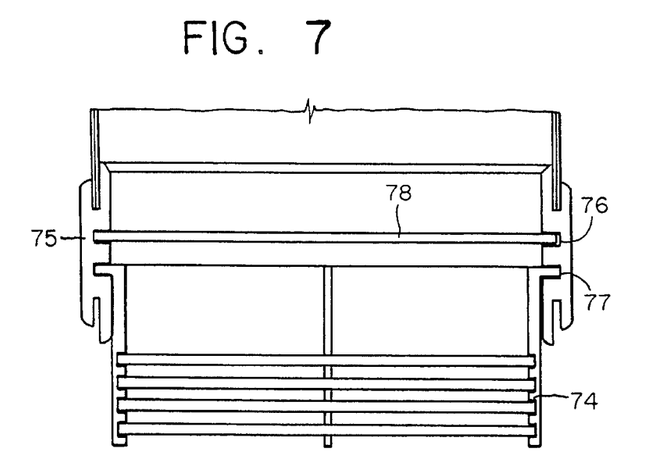
FIGS. 7–12 illustrate various emitters which may be used with the illumination device illustrated in FIG. 6.

The direction of light exiting the bottom of the light tube may be controlled by a light emitter. Light emitter may be of a wide variety of designs depending on the desired illumination. The emitter, which is shown in greater detail in FIG. 7, comprises an outlet cap 75 formed of a heat resistant material, such as a silicone compound. Outlet cap 75 preferably comprises at least an upper-inwardly facing slot 76 and a lower inwardly-facing slot 77 in the same manner as retaining ring 70. Upper slot 76 is preferably utilized to support a protective, transparent bottom cover 78 which may be formed of any suitable, heat-resistant material such as a transparent Pyrex®. Bottom cover 78 serves to prevent dust, other dirt and moisture from entering the interior of the light tube. Lower slot 77 supports a light emitter 74 which comprises four glass disks positioned substantially perpendicular longitudinal axis of the light tube.

Figure 8:
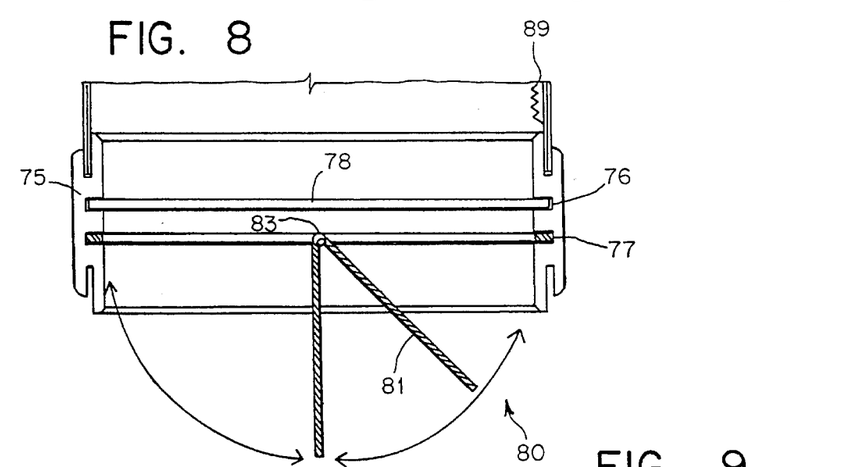
Figure 9:
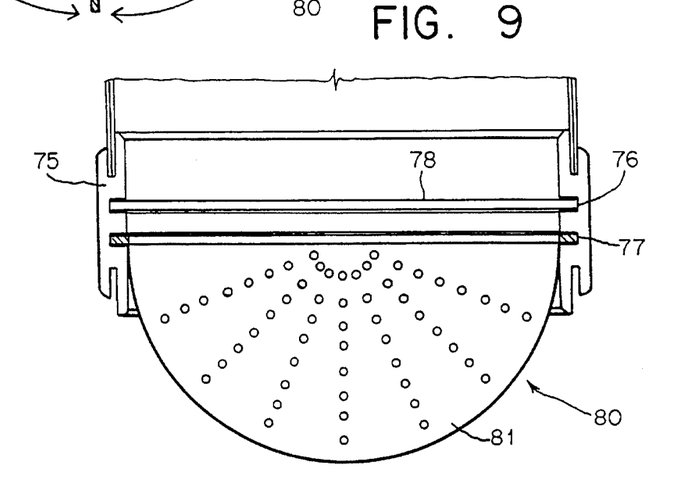

Another light emitter 80 is illustrated in FIGS. 8 and 9. Light emitter 80 comprises a plurality of reflectors 81 pivotally supported on hinge 83 in a manner which permits reflectors 81 to be positioned at various angles relative to the longitudinal axis of the tube. According to this embodiment, the user of the light carrier is provided with the option of reflecting substantially all incident light back into the light tube or positioning one of the reflectors at an angle to direct the light out of the egress end of the tube at an angle to the longitudinal axis of the light tube.

Figures 10, 12:
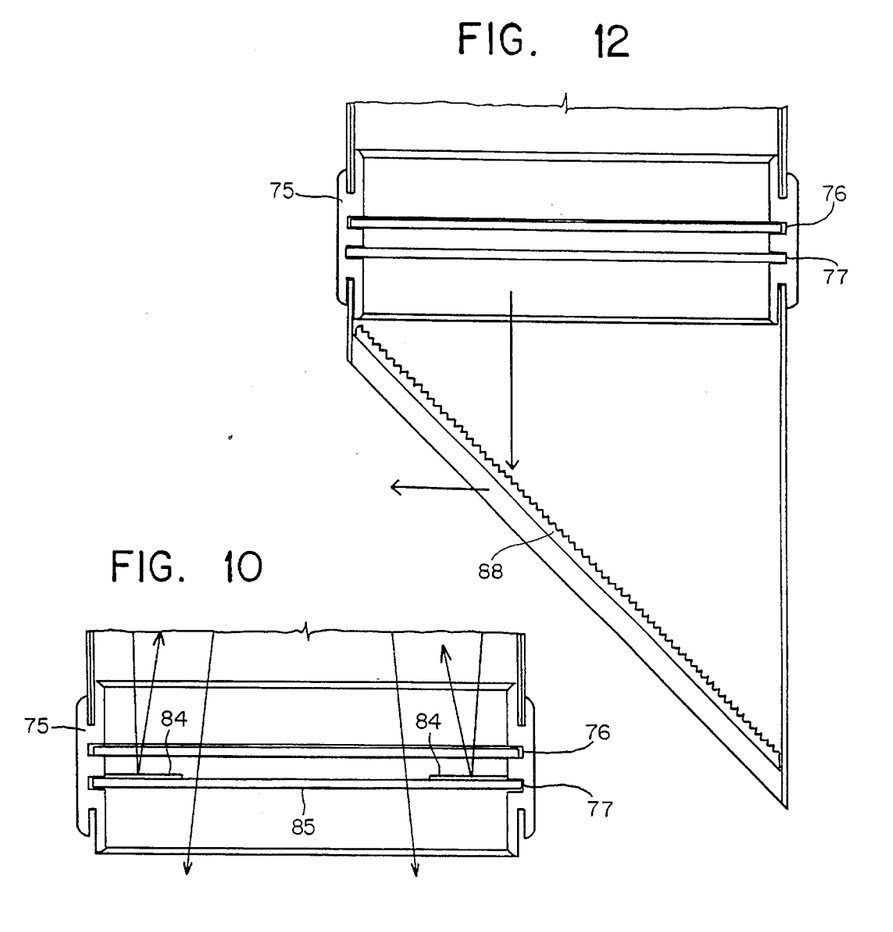

In the emitter illustrated in FIG. 10, a reflective ring is disposed in the lower slot of outlet cap 75 in order to reflect the portion of the light closest to the walls of light tube 60 back into the light tube. The outer portion 84 of the reflective ring is reflective while the inner portion 85 is transparent.

Figure 11:
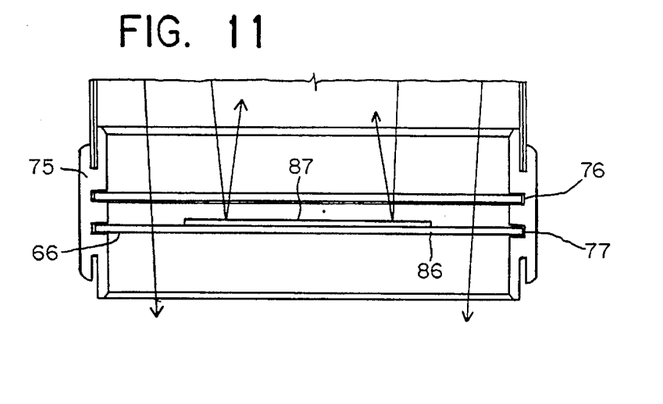

An alternative embodiment is illustrated in FIG. 11 wherein the lower slot 77 of outlet cap 75 supports a disk having an outer transparent portion 86 and an inner reflective portion 87. This embodiment of the present invention reflects the portion of light near the central longitudinal axis of the light tube back into the tube while allowing an outer ring of light to be emitted.

According to a still further embodiment of the present invention illustrated in FIG. 12, a right angle turning lens 88, may be positioned at an angle of 45° to the longitudinal axis of light tube 60 in order to direct the light at an angle substantially perpendicular to the central longitudinal axis of the tube. Those skilled in the art will appreciate that other lenses could be used for directing light at different angles.

Those skilled in the art will also appreciate that the decorative aspects of the light tubes illustrated in FIGS. 6–12 can be varied through the use of colored filters or colored protective polymeric films or tubes.

Another preferred aspect of these embodiments of the present invention comprise some manner of extracting light out of these illuminations devices in the region of the optical light film. For example, one of the extractors described above may be utilized. Alternatively, the OLF can be provided with a relieved section 119, preferably in the form of some decorative shape. From the present description, it will be appreciated that by removing a portion of the optical light film, the internal reflectance at such portions of the illumination device is eliminated. Various shapes and letters can be cut from the optical light film or an extractor 89 can be employed in the manners illustrated in FIG. 6.

Figures 13, 14:
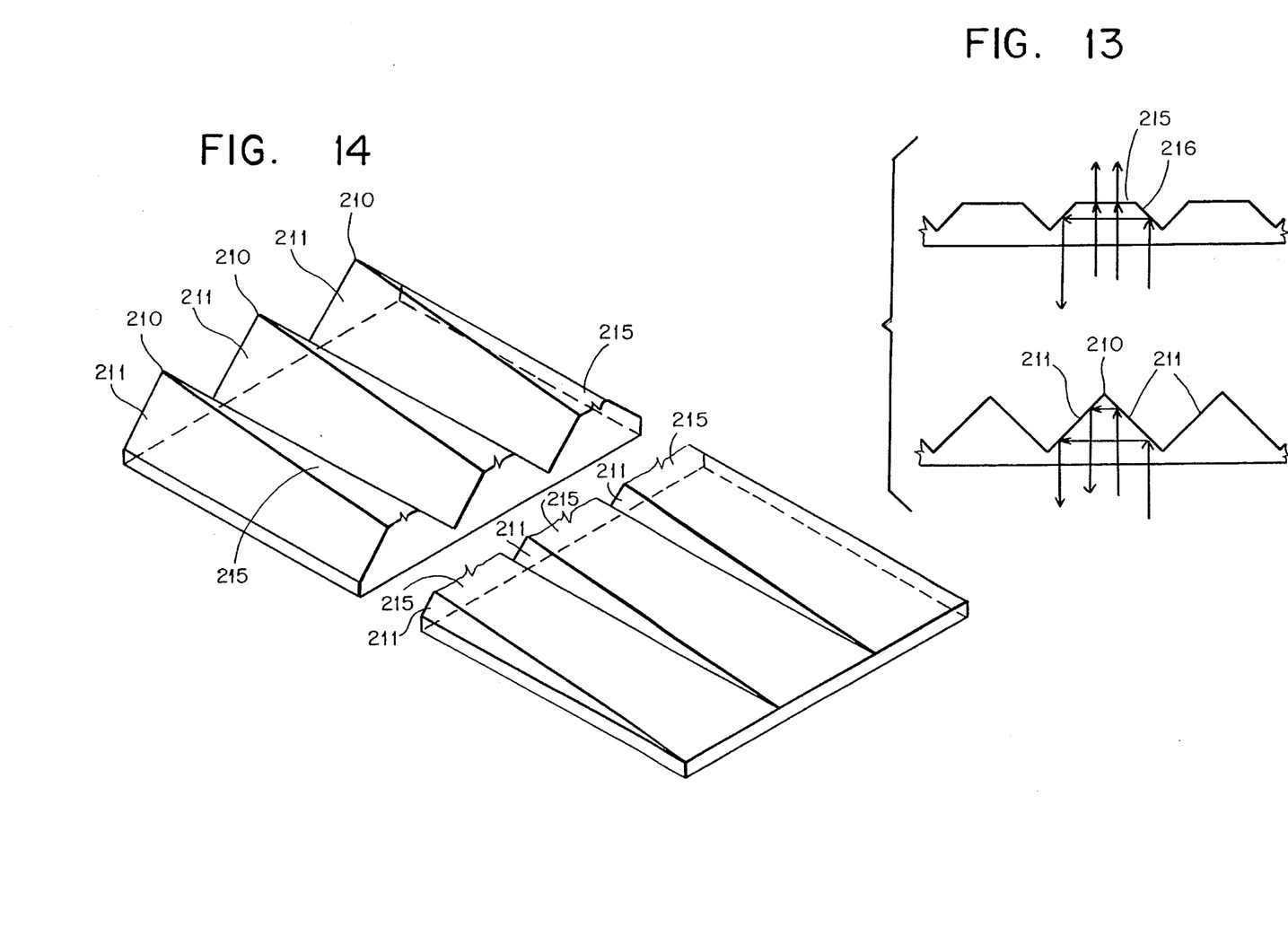
FIGS. 13 and 14 illustrate an optical light film of the present invention.
Figure 15:
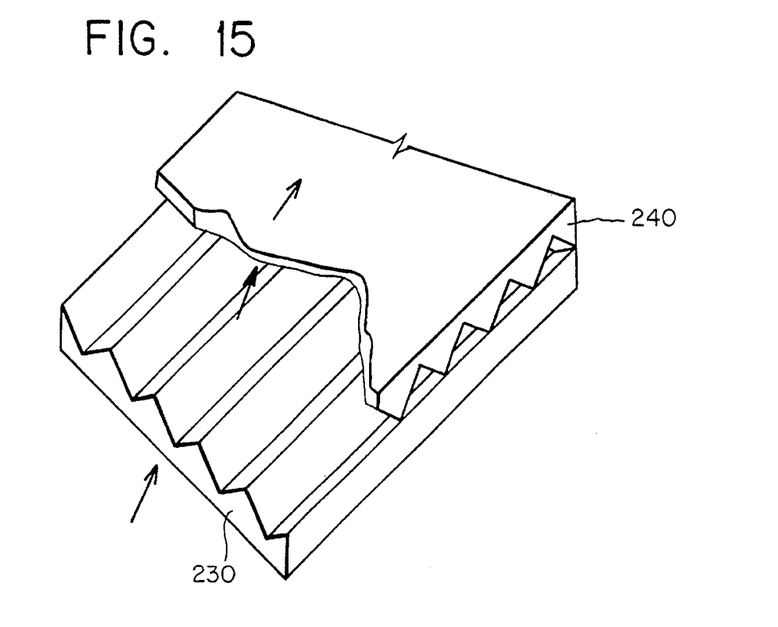
FIGS. 15 and 16 illustrate the arrangement of a plurality of optical light films used in another embodiment of the present invention.

Another aspect of the present invention comprises a light tube formed with an improved optical light film. According to this embodiment of the present invention which is illustrated in FIGS. 13–15, some of the peaks on the grooved side of an optical light film are modified in order to reduce the internal reflectance of those areas of the optical light film. Those skilled in the art will appreciate that the internal reflectance property of optical light film is dependent upon precisely formed ridges on the outside surface of a light tube. These ridges are typically formed with sidewalls converging at angles of about 90°. If, however, these ridges are modified by removing a portion of the peak, light incident on the modified portion will have a much greater tendency to "escape" from the light tube than in a conventional light tube. This embodiment of the present invention advantageously eliminates the need for supplemental extractors which are used to reduce the internal reflectance of a portion of the optical light film.

With reference to FIG. 13, conventional peak 210 is defined by converging sidewalls 211 which meet at an angle of about 90° forming a substantially triangular cross section. Typically, light incident upon one side wall 211 of a tube at an angle of incident less than about 28° will be reflected to the adjacent sidewall of the same peak and then reflected internally back into the interior of the light tube. In the illustrated embodiment, light incident on a modified portion 215 will escape while light incident on an unmodified portion 216 of a modified peak will still be internally reflected.

The peaks of the light film can be modified after manufacturing in any suitable manner. For example, the ridges may be precisely milled, scraped, melted, e.g. with a laser beam, or if less precision is required, crushed between rigid rollers. Those skilled in the art will appreciate that the amount of light escaping through a modified peak will be dependent upon the amount of the peak that has been modified. As shown in FIG. 14, a single ridge can have different degrees of modification in order to permit a greater amount of incident light to exit at one end of the tube. Those skilled in the art will appreciate that a greater amount of light will typically pass through the tube (escape) at the end closer to the source of illumination. Therefore, by modifying a greater portion of the ridge at the distal end which is further away from the light source, a substantially constant amount of light can be emitted over the entire length of the tube.

In addition to providing the method of modifying optical light film described above, the present invention also includes an optical light film which is initially formed without perfect peaks in desired areas in order to allow the escape of light in those regions.

Figure 16:
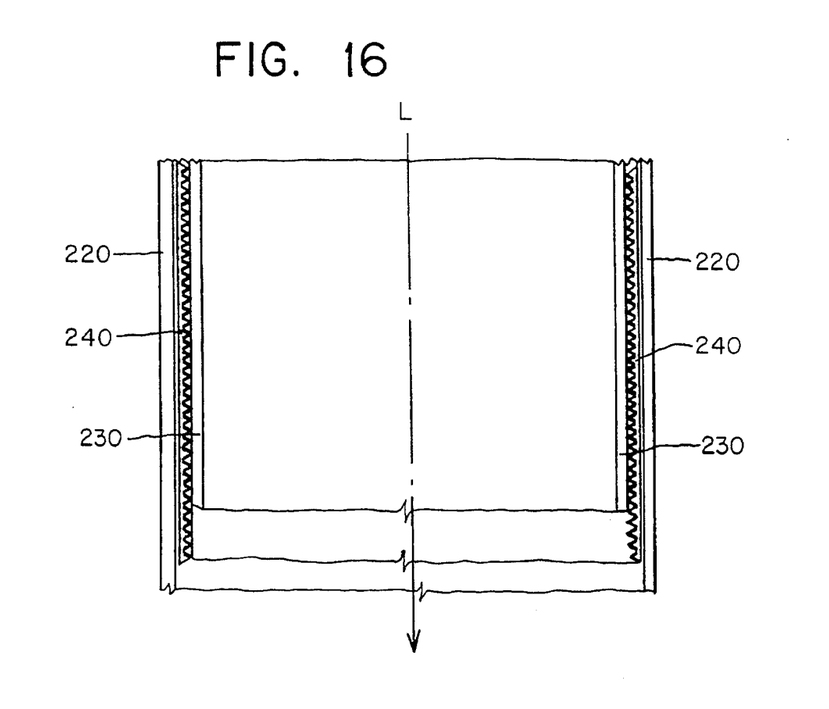

Another embodiment of the present invention provides a decorative light carrier which creates an apparently changing illumination, generally in the shape of a flame, as the distance between the observer and the device changes. This embodiment, which is illustrated in FIGS. 15–16, is formed by placing two sheets of optical light film into contact, with the ridged sides touching and with the ridges positioned at an angle of at least 45°, preferably at least 70° and most preferably substantially perpendicular. This decorative light tube is most preferably arranged such that the ridges of the inner optical light film are arranged in the same direction as the longitudinal axis of the tube. According to the preferred illustrated embodiment shown in FIG. 16, two sheets of optical light film are disposed within a protective outer transparent film 220. The ridges of the inner optical film 230 are preferably positioned substantially parallel to longitudinal axis L while the ridges of the outer optical light film 240 extend circumferentially around the tube.

Figure 17:
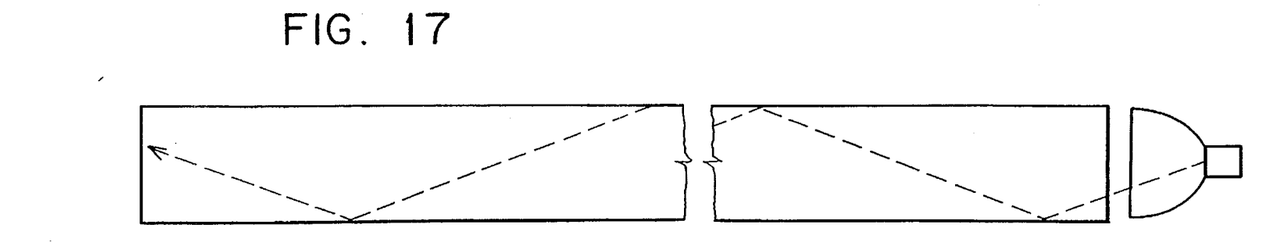
FIGS. 17 and 18 illustrate the effects of using a tapering light tube of another embodiment of the present invention.
Figure 18:
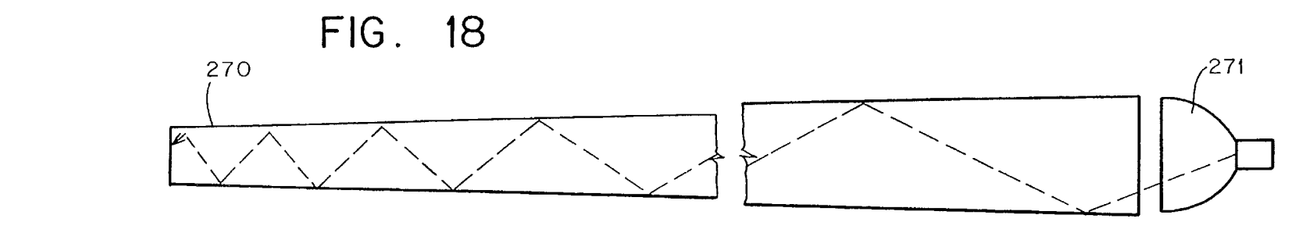

Another embodiment of the present invention provides a light tube having a diameter which decreases toward the distal end 270 of the light tube, i.e., in the direction away from the source of illumination 271. Since the amount of light escaping from a tube is directly proportional to the amount of light striking the sidewalls of the tube, at angles less than the critical angle of reflectance which is about 30°, greater quantities of light can be emitted from the distal end by decreasing the diameter of the tube and thereby increasing the incidence of light on the small end of the tube. FIGS. 17 and 18 illustrate this principle wherein a light ray emanating from a light source impinges upon the sidewall of two light tubes, one having a constant diameter and the other tapered. As generally illustrated, the taper will increase the frequency of contacts between a light beam and the sidewalls of a light tube. This embodiment is preferably constructed by cutting a sheet of optical light film into a trapezoidal shape, shaping the optical light film into a tapered tube, and securing the ends of the tapered light tube. The length of the tube and the degree of taper are limited only by the starting materials. For example, one such tapered tube has an ingress end with a diameter of about eight inches which tapers down to an egress diameter of about four inches over a longitudinal length of about 4 feet.

Figure 19:
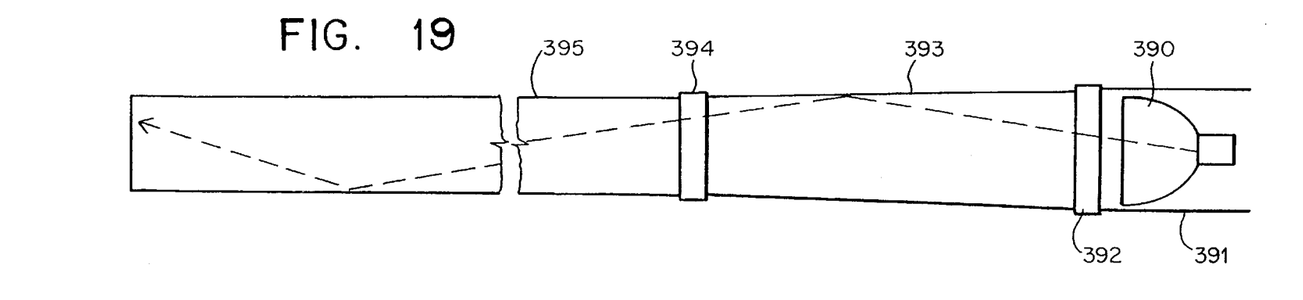
FIG. 19 illustrates an illumination device of another embodiment of the present invention which utilizes at least one tapering light tube.

From the present description, it will be appreciated that rings, such as the heat resistant retaining rings described above, will have many uses in illumination devices. Rings constructed in the fashion illustrated in FIGS. 6–12 may also be utilized to form other useful illumination devices. For example, FIG. 19 illustrates another use of a tapering light tube 393 and heat-resistant rings 392, 394. In this embodiment of the present invention, a light source 390 is positioned within a light housing 391. The light housing 391, which has a first diameter, is connected to a tapering light tube 393 with a ring 392. Ring 392 is preferably of the type illustrated above in FIGS. 6–12. A second ring 394 having a different diameter is utilized to connect the other end of tapering tube 393 to another light tube which has a diameter or cross-sectional configuration which is different from that of light housing 391. This embodiment of the present invention is particularly suited for connecting elements that have cross-sections of different sizes and/or shapes.

Figure 20:
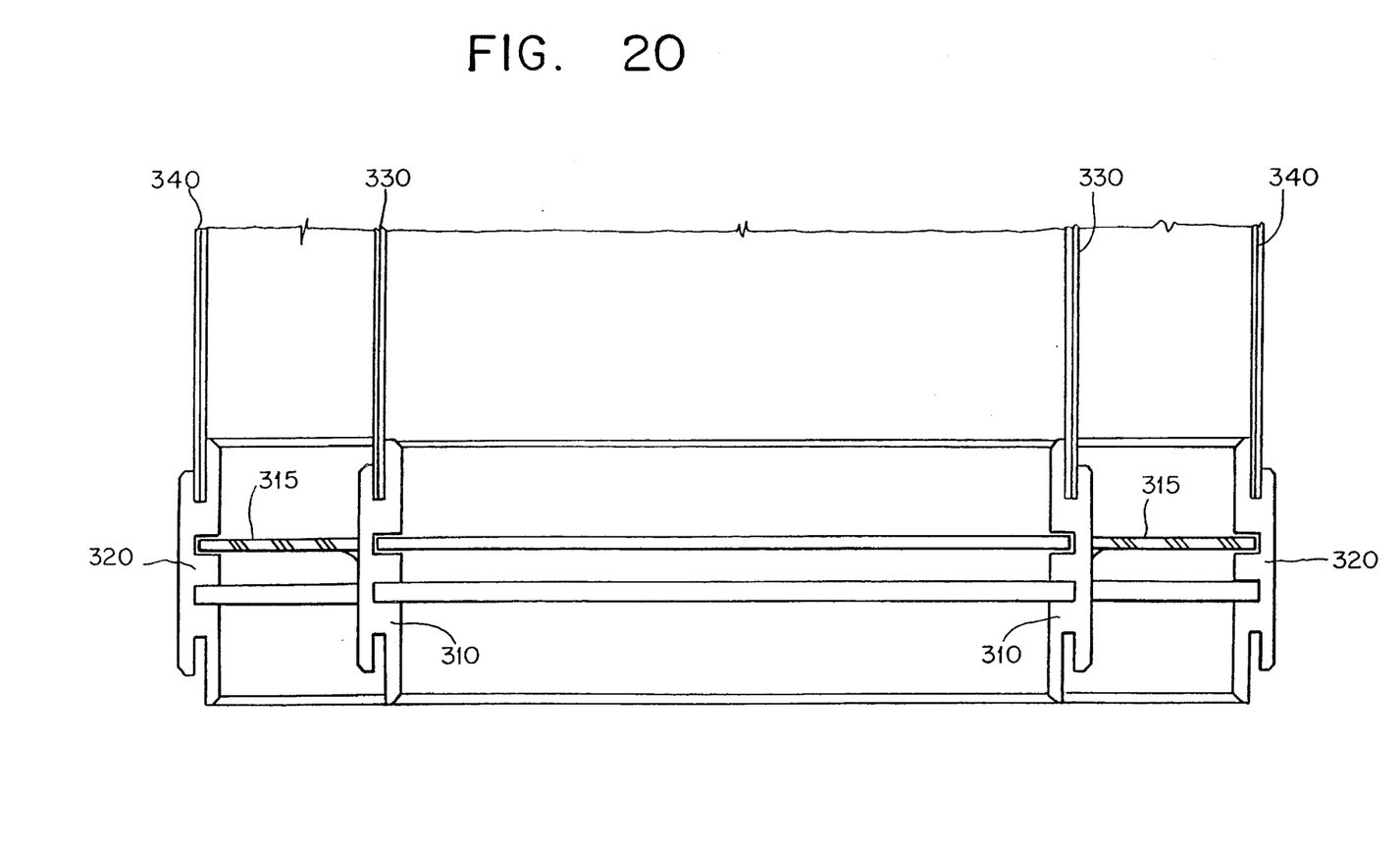
FIG. 20 illustrates a tube-in-a-tube embodiment of the present invention.

FIG. 20 illustrates a still further use for the illustrated rings wherein a tube-in-a-tube construction is formed using an inner retaining ring 310 which is positioned inside an outer retaining ring 320 having a larger diameter. In the manner illustrated in FIG. 20 the inner retaining ring 310 is positioned by a spacer ring 315 which is held in place by an inwardly facing groove of outer retaining ring 320. The spacer ring 315 can be formed of any substantially rigid material, for example a metal or a plastic. The spacer ring 315 is most preferably heat resistant. This tube-in-a-tube construction is particularly useful for providing a protective casing 340 for a light tube 330 and/or providing a colored or finished cover to create a desired light effect. Casing 340 can advantageously comprise a plurality of layers.

Another aspect of the present invention comprises methods of forming light tubes within pre-formed carriers, for example polycarbonate tubes. From the description below, those skilled in the art will appreciate that the methods described herein may also be utilized to form light tubes in carriers that are not circular in cross-section as well as carriers that are not completely continuous, i.e. closed in cross-section. One method of forming light tubes within a cylindrical carrier is illustrated in FIGS. 21–28. These methods are particularly useful in forming light tubes within pre-formed cylindrical tubes. For example, light tubes having a diameter of 4 inches can be readily formed in lengths of 20 feet.

Figure 21:
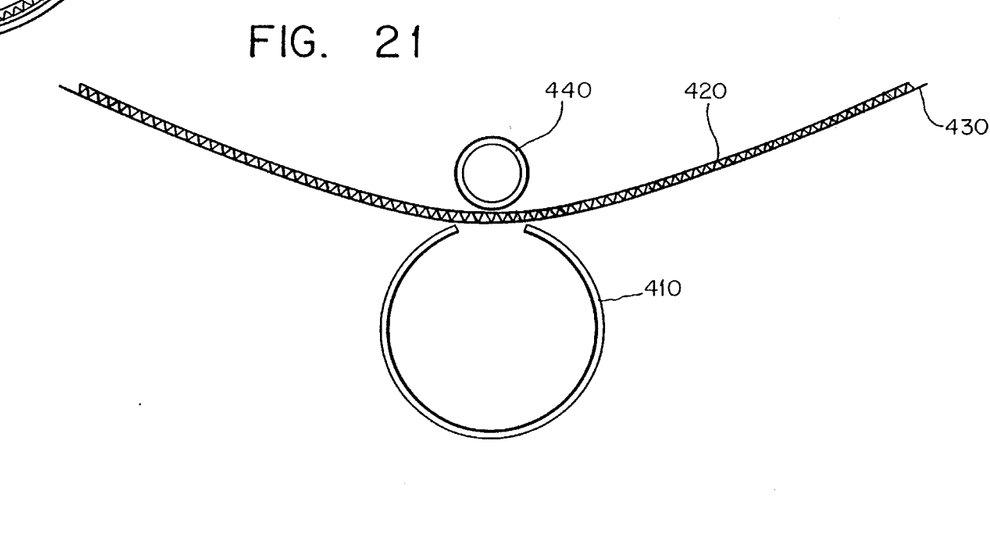
FIGS. 21–28 illustrate methods of the present invention for disposing a light tube within a preformed carrier.

With reference to FIG. 21, the first step comprises providing a gutter 410 preferably having a length equal to the length of the final light tube and a longitudinal relieved section defined by opposing side walls of gutter 410 through which an optical light film can be inserted. From the description above, it will be appreciated that in order to conduct light, optical light films used with the various embodiments of the present invention have a plurality of prismatic grooves/peaks which face outwardly when the optical light film is formed into a light tube. In order to prevent these peaks/grooves from being damaged along the edges of gutter 410, a protective sheet 430 is advantageously placed between the optical light film and the gutter 410. The protective sheet 430 is preferably formed of a material which has is pliable and has a substantially low coefficient of friction with the other elements utilized during this assembly procedure. For example, when the gutter 410 is formed of a polycarbonate, protective sheet 430 may be formed of a material such as Tyvek™ sold by DuPont of Wilmington, Del.

Figure 22:
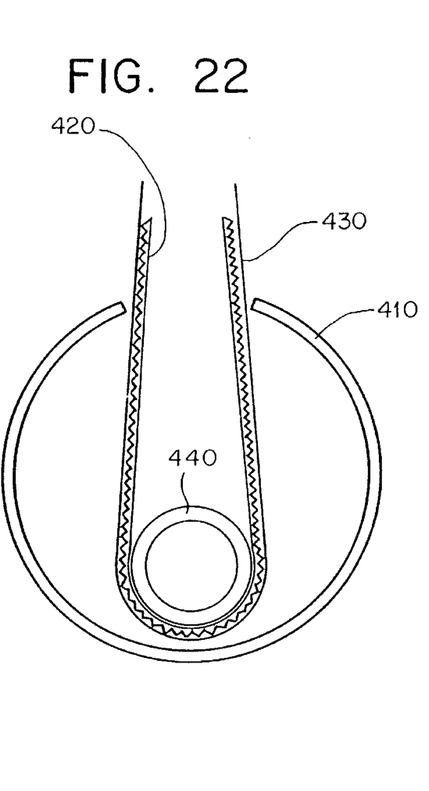
Figure 23:
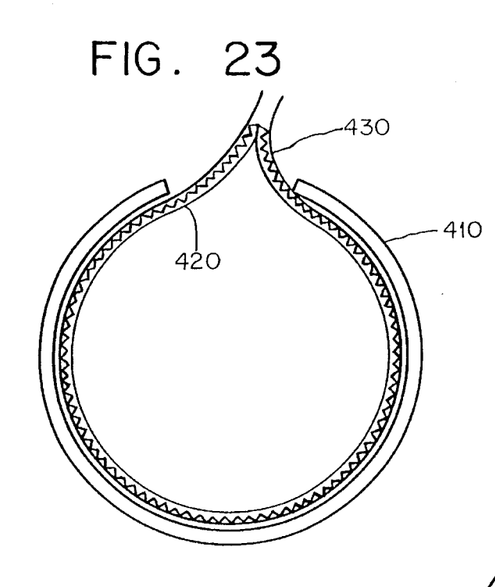
Figure 24:
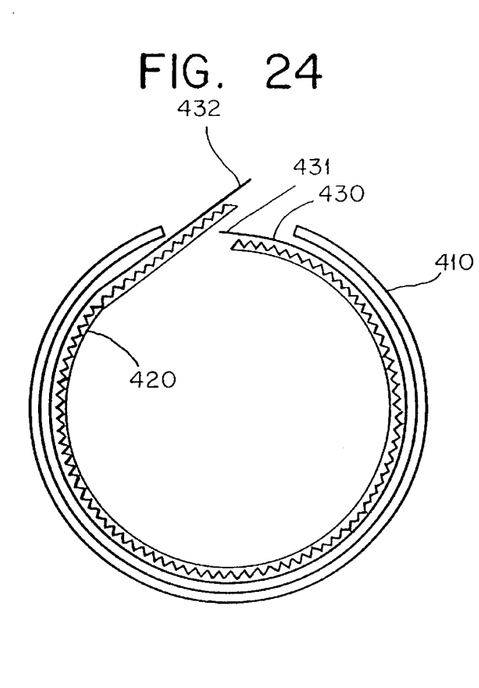
Figure 25:
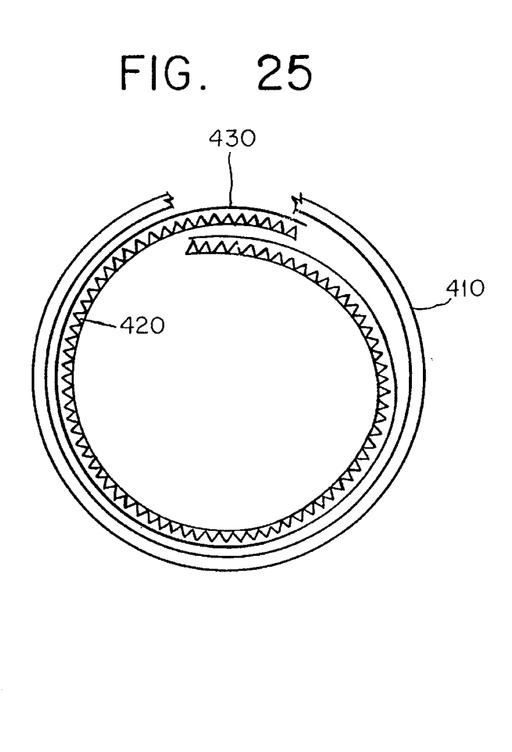
Figure 26:
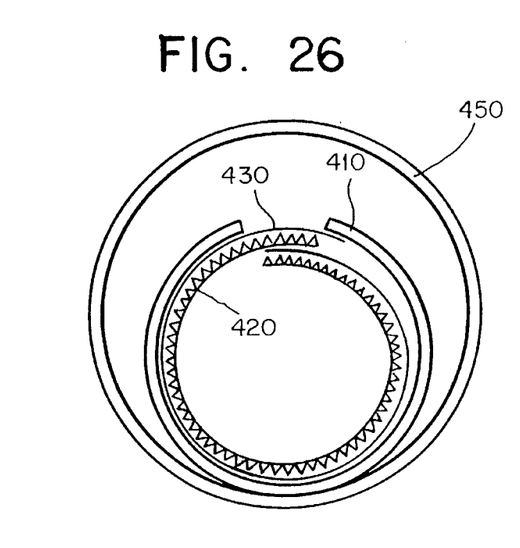

With the protective sheet 430 in place, the optical light film 420 can then be pushed into gutter 410 with the help of a weighted rod 440 in the manner shown in FIG. 22. The heavy rod 440 is then removed and the optical light film 420 and protective sheet 430 can be adjusted inwardly to correspond with the general shape of gutter 410 in the manner shown in FIG. 23. The lower edge 431 of protective sheet 430 is then folded under the upper edge 432 in the manner illustrated in FIG. 24 and then the upper edge 432 is also folded inwardly such that the entire optical light film 420 and protective sheet 430 are disposed within gutter 410 in the manner shown in FIG. 25. Since gutter 410 has a diameter less than the diameter of the tube 450 into which the optical light film will be ultimately disposed, gutter 410 is then simply inserted into an open end of tube 450.

Figure 27:
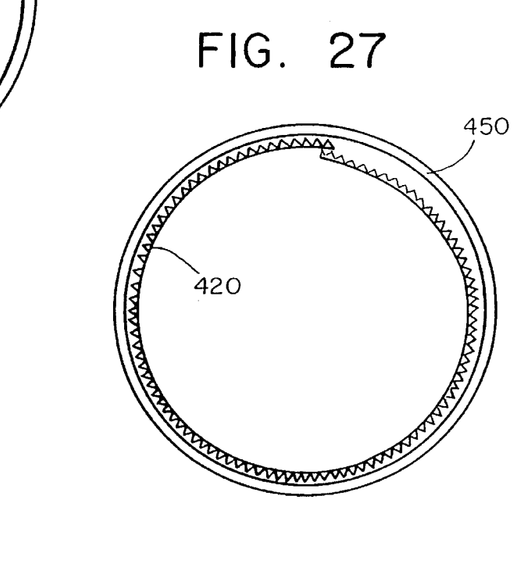
Figure 28:
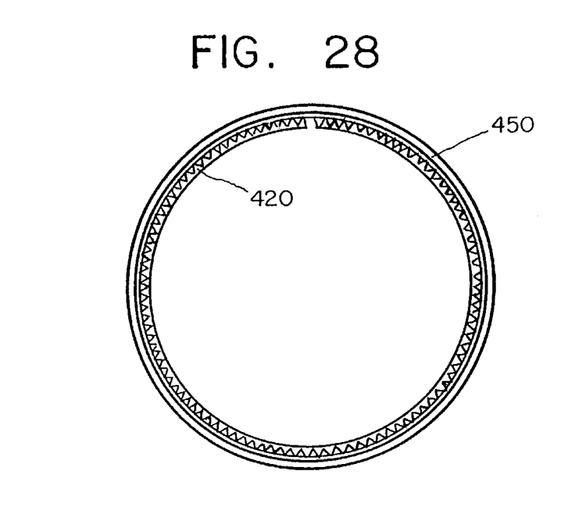
Figure 29:
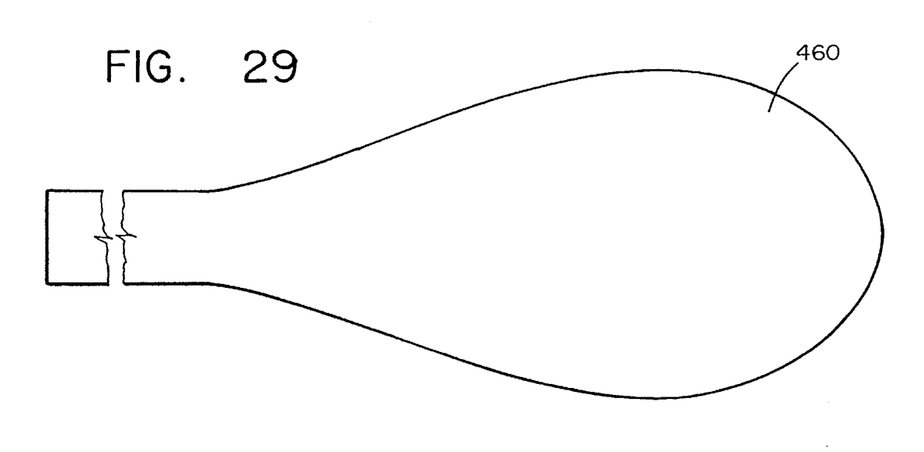
FIG. 29 illustrates a plunger which is useful with the methods illustrated in FIGS. 21–28.

According to this embodiment of the present invention, the optical light film 420 is then attached, e.g. clamped, to the end of outer tube 450 and the gutter 410 and protective sheet 430 are removed from the other end, leaving optical light film 420 within outer tube 450 in the manner shown in FIG. 27. If the optical light film, due to its inherent resiliency and elasticity, does not conform to the inner surface of outer tube 450, a plunger 460, for example having a cross-section such as the one shown in FIG. 29, can be pushed into the interior of optical light film 420 forcing the optical light film 420 outwardly such that the opposing edges of optical light film 420 snap into position as shown in FIG. 28.

According to another embodiment of the present invention which provides an alternative method for installing an optical light film into a closed rigid tube, the steps illustrated in FIGS. 21–25 are repeated. The longitudinal recess of the gutter 410 may optionally be blocked to prevent the optical light film 420 and protective sheet 430 from working their way out of gutter 410. In this embodiment, one end of gutter 410 is then aligned with an open end of outer tube 450, a flexible lead is fed through outer tube 450 and attached to protective sheet 430 and optical light film 420. The protective sheet 430 and optical light film 420 are then drawn out the open end of gutter 410, which is maintained substantially outside of outer tube 450, and into outer tube 450.

The protective sheet 430 is preferably a flexible material having a low coefficient of friction and is substantially tear-resistant such that it will not tear upon contact with the edges of the gutter 410. While any low friction, tear-resistant material can be utilized, the material which has been found useful is Tyvek™ made by Dupont, of Wilmington, Del.

The protective sheet 430 can then be readily removed in the manner described above by clamping one end of the optical light film 420 to the outer tube 450 and drawing the protective carrier 430 out the other end. If the optical film 420 did not conform to the inner surface of tube 450, for example as shown in FIG. 27, the plunger 460 illustrated in FIG. 29 can again be utilized in the manner described above.

Unlike methods heretofore described and utilized in the art, the methods of the present invention provide for ways of positioning optical light film within rigid tubes with a minimal amount of manpower. Previous methods which required the rolling of a sheet of optical light film within an outer protective, low-friction sheet required numerous pairs of hands, and were therefore cost-intensive. Another disadvantage of such methods was that the rolled-up optical light film and protective sheet would tend to unroll and would become very difficult to push into the outer tube. Another disadvantage is that the fragile optical light film cannot withstand too much pushing before fracturing. The methods of the present invention advantageously minimize the amount of stress placed on the fragile optical light film.

Another aspect of the present invention comprises a method of disposing an extractor in a light tube proximate an optical light film in a neat, efficient manner. This method is particularly useful with extractors which reflect incident light at a variety of different angles. For example, a product marketed under the name SCOTCHCAL™ sold by the 3M Company of St. Paul, Minn. is one such extractor. Typically such extractors are installed using a coating of water to facilitate the positioning of the extractor on the surface to which the extractor will be attached. Those skilled in the art will appreciate that wetting an optical light film can be detrimental to the internal-reflectance properties of the film and should, whenever possible, be avoided. This method of the present invention therefore comprises first connecting the extractor to a thin film and then disposing the extractor/thin film laminate onto the configured sheet of optical light film. Those skilled in the art will appreciate that the present method avoids the need for working with water in the presence of the optical light film and the inherent risks of wetting the grooves of the optical light film.

I claim:

1. A light device comprising:

a first optical light film comprising a plurality of grooves extending along a first axis of said first optical light film;

a second optical light film comprising a plurality of grooves extending along a second axis of said second optional light film;

wherein said grooves of said first optical light film are disposed at an angle to and in contact with said grooves of said second optical light film such that said first axis is arranged at an angle of at least 45° to said second axis.

2. A light device according to claim 1 wherein said films are arranged such that said first axis and said second axis are substantially perpendicular.

3. A light carrier comprising:

an optical light tube comprising an inner surface and an outer surface;

a substrate; and an extractor laminated to said substrate wherein said substrate-extractor laminate is disposed within and proximate to an inner surface of said tube.

4. A method of forming a light carrier comprising the steps of:

providing a first tube comprising at least one open end;

providing a guide tube comprising a longitudinal relieved portion and a cross-section dimensioned to permit said guide tube to fit at least partially within said open end of said first tube;

placing an optical light film and a protective sheet over said relieved portion;

pushing said optical light film and said protective sheet through said relieved portion into said guide tube; and positioning said light film and said protective sheet in said first tube.

5. A method according to claim 4 wherein said positioning step comprises disposing said guide tube, said optical light film and said protective sheet within said first tube and subsequently removing said guide tube and said protective sheet.

6. A method according to claim 4 wherein said positioning step comprises pulling said optical light film and said protective sheet from said guide tube into said first tube.

7. A light carrier formed by the method of claim 4.

* * * * *